United States Patent
Seo (10) Patent No.: US 9,877,163 B2
(45) Date of Patent: Jan. 23, 2018

(54) METHOD FOR DETECTING SYNCHRONIZED TERMINAL WITH POSE SIMILAR TO REFERENCE POSE DATA, METHOD FOR TRANSMITTING MESSAGE, AND COMPUTER READABLE STORAGE MEDIUM RECORDED WITH PROGRAM THEREFOR

(71) Applicant: Yong Chang Seo, Seoul (KR)

(72) Inventor: Yong Chang Seo, Seoul (KR)

( * ) Notice: Subject to any disclaimer, the term of this patent is extended or adjusted under 35 U.S.C. 154(b) by 345 days.

(21) Appl. No.: 14/410,824

(22) PCT Filed: Feb. 20, 2014

(86) PCT No.: PCT/KR2014/001392
§ 371 (c)(1),
(2) Date: Dec. 23, 2014

(87) PCT Pub. No.: WO2014/129827
PCT Pub. Date: Aug. 28, 2014

(65) Prior Publication Data
US 2015/0163640 A1 Jun. 11, 2015

(30) Foreign Application Priority Data

Feb. 20, 2013 (KR) ........................ 10-2013-0017902
Jun. 27, 2013 (KR) ........................ 10-2013-0074820

(51) Int. Cl.
*H04W 4/04* (2009.01)
*H04W 4/12* (2009.01)
*H04W 4/02* (2009.01)

(52) U.S. Cl.
CPC ............. *H04W 4/04* (2013.01); *H04W 4/023* (2013.01); *H04W 4/12* (2013.01)

(58) Field of Classification Search
CPC ..... H04W 4/026; H04W 4/024; H04W 4/023; H04W 4/04; H04W 4/12; H04W 16/28; H04W 4/02; G08G 1/0969; H04B 17/27
See application file for complete search history.

(56) References Cited

U.S. PATENT DOCUMENTS

| 8,437,773 B2 * | 5/2013 | Sridhara ................ H04H 60/49 370/338 |
| 2008/0114539 A1 | 5/2008 | Lim |

(Continued)

FOREIGN PATENT DOCUMENTS

| EP | 2541878 A1 | 1/2013 |
| JP | 2001211256 A | 8/2001 |

(Continued)

OTHER PUBLICATIONS

European Patent Office, Extended European Search Report Issued in Application No. 14754336.7, dated Jul. 4, 2016, Germany, 5 pages.

(Continued)

*Primary Examiner* — Charles Appiah
*Assistant Examiner* — Edward Zhang
(74) *Attorney, Agent, or Firm* — McCoy Russell LLP (57) ABSTRACT

Disclosed is a method for detecting a synchronized terminal with a pose similar to reference pose data. In the embodiments, a method includes: enabling a detection server to receive reference pose data from a mobile terminal requesting the detection of a synchronized terminal; enabling the detection server to receive position data providing a reference for detecting the synchronized terminal; enabling the detection server to receive the respective pose data of the surrounding terminals present within a given radius from the reference position determined based on the position data; enabling the detection server to detect one of the surrounding terminals as the synchronized terminal that has pose data similar to the reference pose data; and enabling the detection (Continued)

server to transmit the result of detecting the synchronized terminal to the mobile terminal.

10 Claims, 7 Drawing Sheets

(56) References Cited

U.S. PATENT DOCUMENTS

| | | | | |
|---|---|---|---|---|
| 2008/0117102 | A1* | 5/2008 | Syrjarinne | G01S 19/05 342/357.42 |
| 2009/0054077 | A1* | 2/2009 | Gauthier | G06F 3/014 455/456.1 |
| 2010/0205242 | A1* | 8/2010 | Marchioro, II | G06Q 10/10 709/203 |
| 2010/0233999 | A1* | 9/2010 | Loeb | H04M 1/72572 455/414.1 |
| 2012/0041966 | A1* | 2/2012 | Kamali | H04M 1/72522 707/758 |
| 2012/0064921 | A1* | 3/2012 | Hernoud | G01C 21/20 455/456.6 |

FOREIGN PATENT DOCUMENTS

| | | |
|---|---|---|
| JP | 2002165009 A | 6/2002 |
| JP | 2010529745 A | 8/2010 |
| JP | 2011199800 A | 10/2011 |
| KR | 10-2006-0117140 A | 11/2006 |
| KR | 10-2011-0057298 A | 6/2011 |
| KR | 10-2011-0070210 A | 6/2011 |
| KR | 10-2012-0033162 A | 4/2012 |
| WO | 2011105322 A1 | 9/2011 |

OTHER PUBLICATIONS

International Searching Authority, International Search Report of PCT/KR2014/001392, dated May 15, 2014. [PCT/ISA/210].

* cited by examiner

METHOD FOR DETECTING SYNCHRONIZED TERMINAL WITH POSE SIMILAR TO REFERENCE POSE DATA, METHOD FOR TRANSMITTING MESSAGE, AND COMPUTER READABLE STORAGE MEDIUM RECORDED WITH PROGRAM THEREFOR

CROSS REFERENCE TO RELATED APPLICATIONS

This application is a National Stage of International Application No. PCT/KR2014/001392 filed Feb. 20, 2014, claiming priority based on Korean Patent Application Nos. 10-2013-0017902 filed Feb. 20, 2013 and 10-2013-0074820 filed Jun. 27, 2013, the contents of all of which are incorporated herein by reference in their entirety.

TECHNICAL FIELD

Disclosed technology relates to a method of detecting a synchronized terminal having a reference pose, for example, a pose similar to that of a mobile terminal of a user, a method of transmitting a message to a synchronized terminal, and a computer readable recording medium on which a program for the method is recorded.

BACKGROUND ART

As technology for measuring a location of a mobile terminal, a method of using a Global Positioning System (GPS) and a method of using a receiving signal of a wireless network base station are generally used. However, the method of using GPS has a drawback that cannot be used indoor and the method of using a receiving signal of a base station has a drawback of somewhat deteriorated accuracy.

As the prior art of measuring a location of a terminal, there is technology disclosed at Korean Patent Laid-Open Publication Nos. 2013-0002748 (method of positioning location and system and apparatus for the same) and 2013-0002240 (positioning system for location-based service using wireless LAN signal intensity). However, because the conventional art has an error range of about several meters when measuring a location of a mobile terminal, the conventional art has a drawback that accurate positioning to distinguish a location of each terminal located at a near distance is impossible. Therefore, conventional positioning technology has a problem that cannot provide a service in which a user of a mobile terminal specifies a random terminal located within several meters and transmits a message to a user of the specified terminal.

DETAILED DESCRIPTION OF INVENTION

Technical Problem

A technical object of disclosed technology is to provide a method in which a mobile terminal specifies any one of random terminals located at a near distance by interlocking with a detection server. According to an exemplary embodiment of disclosed technology, as a user of a mobile terminal disposes the mobile terminal with a pose similar to that of a terminal (hereinafter, a synchronized terminal) in which the user of the mobile terminal is to specify among peripheral terminals, a detection server detects a synchronized terminal having a pose similar to that of the mobile terminal. When one of peripheral terminals located at a near distance is specified, the user may provide various services such as transmission of a message to the specified synchronized terminal or transmission of a coupon or a product coupon (e.g., giftcon). Disclosed technology has a characteristic in which a mobile terminal can recognize a synchronized terminal by independently taking a pose similar to the synchronized terminal to specify, unlike technology in which a mobile terminal and the synchronized terminal recognize each other, as both the mobile terminal and the synchronized terminal simultaneously perform a previously promised specific operation. That is, according to disclosed technology, in order for a mobile terminal to recognize a synchronized terminal, because the mobile terminal does not require an intentional action of the synchronized terminal, the mobile terminal may independently recognize a terminal of an unknowing person.

For example, conventionally, when a user finds the favorite opposite sex at a periphery and wishes to transmit a text message, there is a problem that the user cannot specify a terminal without participation of the corresponding opposite sex. Further, existing positioning technology has a limitation of deteriorated accuracy in specifying any one of terminals located at a near distance. However, according to disclosed technology, as the user disposes a mobile terminal similarly to a terminal of the favorite opposite sex, the user may specify a terminal of the corresponding opposite sex (i.e., a synchronized terminal) and transmit a text message to the corresponding opposite sex.

Technical Solution

In accordance with a first aspect of the present invention, a method of detecting a synchronized terminal having a pose similar to that of reference pose data (the pose data includes at least one of a location direction and an inclined level) includes: receiving, by a detection server, reference pose data from a mobile terminal that requests detection of a synchronized terminal; receiving, by the detection server, location data to be a reference that detects the synchronized terminal; receiving, by the detection server, pose data of peripheral terminals from each of the peripheral terminals existing within a predetermined radius from a reference location determined based on the location data; detecting, by the detection server, a terminal having pose data similar to the reference pose data among the peripheral terminals as a synchronized terminal; and transmitting, by the detection server, a detection result of the synchronized terminal to the mobile terminal.

In accordance with a second aspect of the present invention, a method in which a mobile terminal detects a synchronized terminal having a pose similar to that of the mobile terminal includes: collecting, by the mobile terminal, pose data including at least one of a location direction and an inclined level of the mobile terminal; transmitting, by the mobile terminal, the pose data to a detection server; and receiving, by the mobile terminal, a detection result of a synchronized terminal having pose data similar to the pose data within a predetermined radius from a reference location from the detection server.

In accordance with a third aspect of the present invention, a method of detecting a synchronized terminal having a pose similar to reference pose data (the pose data includes at least one of a location direction and an inclined level) includes: receiving, by the synchronized terminal, a request for pose data from a detection server; collecting, by the synchronized terminal, the pose data including at least one of a location direction and an inclined level of the synchronized terminal; and transmitting the pose data to the detection server.

In accordance with a fourth aspect of the present invention, a method in which a first terminal transmits a message to a second terminal located at a periphery includes: photographing an image including the second terminal; and transmitting a message to a terminal having pose data similar to pose data including at least one of a location direction and an inclined level of the second terminal calculated based on the image.

In accordance with a fifth aspect of the present invention, there is provided a computer readable recording medium on which a program for executing the method is recorded.

Advantageous Effects

Exemplary embodiments of disclosed technology may have an effect including the following merits. However, because it does not mean that exemplary embodiments of disclosed technology should include entire merits, the scope of disclosed technology should not be limited by merits.

According to disclosed technology, disclosed technology has a merit that a user can specify another terminal located at a near distance without any unnatural action of another party. Because conventional positioning technology has an error range within several meters or cannot be used indoor, conventional positioning technology has a limitation that conventional positioning technology cannot be used for specifying a terminal located at a near distance. However, according to disclosed technology, a desired another terminal can be easily specified and thus various services using the technology can be provided.

BEST MODES FOR CARRYING OUT THE INVENTION

Because a description on disclosed technology is merely an exemplary embodiment for a structural or functional description, it should not be analyzed that the scope of disclosed technology is limited by an exemplary embodiment described in a detailed description. That is, an exemplary embodiment may be variously changed and may have several forms and thus it should be understood that the scope of disclosed technology includes equivalents that may execute the technical spirit.

In the present application, a meaning of described terms should be understood as follows.

A term such as "first", "second" is used for distinguishing one element from another element and the scope of disclosed technology should not be limited by the terms. For example, a first element may be referred to as a second element, and similarly a second element may be referred to as a first element.

When it is described that an element is "connected" to another element, the element may be "directly connected" to the other element or "electrically coupled" to the other element through a third element. However, when it is described that an element is "directly connected" to another element, no element may exist between the element and the other element. Other expressions, i.e., "-between" and "immediately-between" or "-adjacent to" and "-directly adjacent to" describing a relationship between elements should be similarly analyzed.

It should be understood that singular forms used here include a plurality of forms unless phrases explicitly represent an opposite meaning, and a meaning such as "comprising" or "having" used in a specification indicates presence of a characteristic, numeral, step, operation, element, component, or combination thereof and does not exclude presence or addition of at least one other characteristic, numeral, step, operation, element, component, or combination thereof.

Each step may occur different from described order unless a specific order is not clearly described in a context. That is, each step may occur in described order and may be substantially simultaneously performed and be performed in opposite order.

Entire terms used here have the same meaning as that generally understood by a person of ordinary skill in the art of disclosed technology unless stated otherwise. It should be analyzed that generally using terms defined in a dictionary have a meaning corresponding with that of a context of related technology and are not analyzed as an ideal or excessively formal meaning unless explicitly defined.

Figure 1:
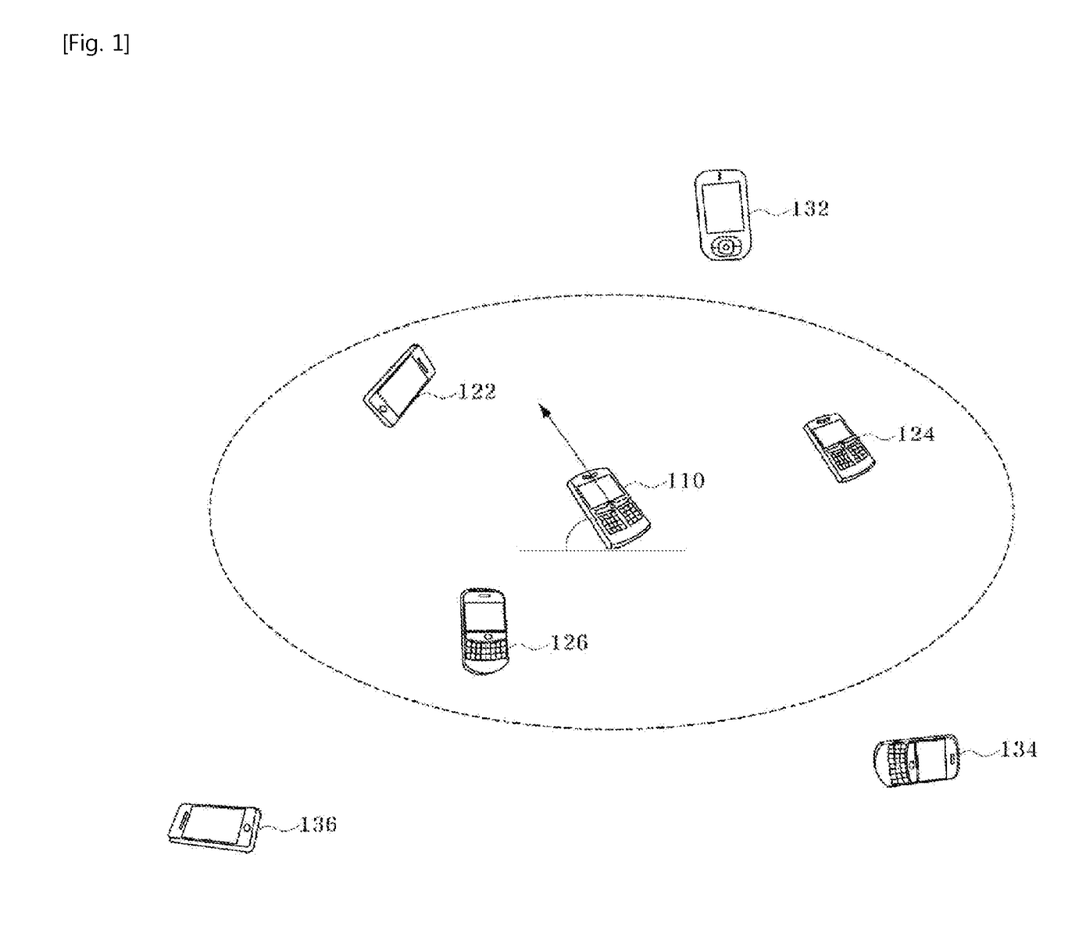
FIG. 1 is a diagram illustrating an environment in which disclosed technology can be applied.
Figure 2:
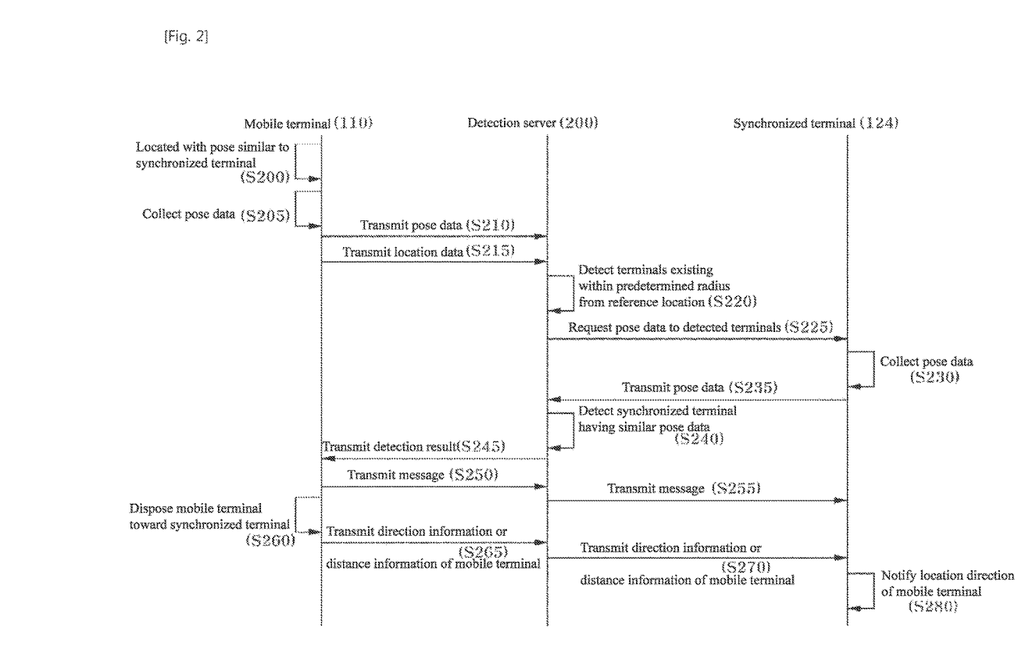
FIG. 2 is a flowchart illustrating a process in which a mobile terminal detects a synchronized terminal and transmits a message to the synchronized terminal according to disclosed technology.

FIG. 1 is a diagram illustrating an environment in which disclosed technology may be applied. A mobile terminal 110 of a user may detect a synchronized terminal 124 having the same pose as that of the mobile terminal 110 among peripheral terminals 122, 124, and 126 located within a constant radius from a reference location, for example, a location thereof. FIG. 2 is a flowchart illustrating a process in which the mobile terminal 110 detects the synchronized terminal 124 and transmit a message to the synchronized terminal 124 according to disclosed technology. The mobile terminal 110 and the peripheral terminals 122, 124, and 126 may give and receive data by wireless based on a mobile communication network, a wireless Local Area Network (LAN), or a personal area network (Bluetooth, etc.), but it is not limited thereto and may use any communication method. A process in which a user finds the favorite opposite sex and transmit a message to the corresponding opposite sex will be described with reference to FIGS. 1 and 2.

Figure 3A:
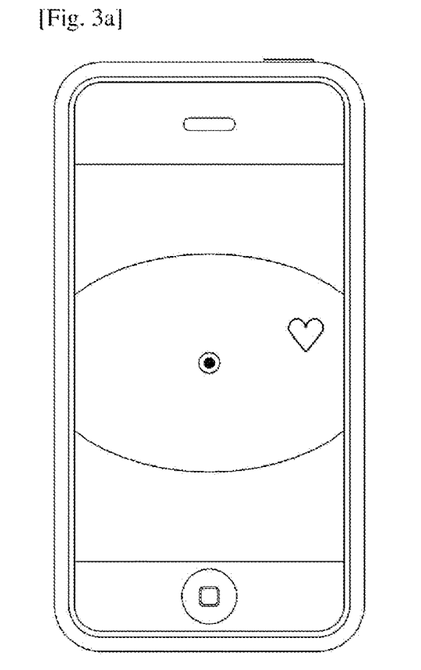
FIGS. 3A and 3B are diagrams illustrating a method in which a synchronized terminal notifies a location of a mobile terminal through a screen.
Figure 3B:
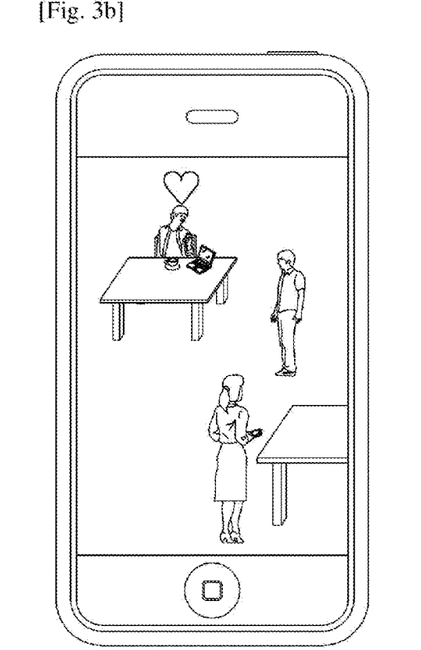

A user, having found the favorite opposite sex disposes a mobile terminal with the same pose as that of a terminal of the corresponding opposite sex, i.e., the synchronized terminal 124 to detect (S200). Here, a pose is a direction toward a terminal or an inclined angle of a terminal, but it is not limited thereto. For example, a pose may further include movement information of a terminal and sequence information in which a direction or angle of a terminal changes. The mobile terminal 110 disposed with a predetermined pose collects pose data thereof (S205). For example, the mobile terminal 110 may collect a direction, an inclined level, a rotation angle, and movement information thereof from a terrestrial magnetic sensor, an acceleration sensor, and a gyroscope sensor. The mobile terminal 110, having collected pose data transmits pose data to the detection server 200 (S210). In addition, according to an implementation, the mobile terminal 110 may transmit location information for determining a reference location to the detection server 200. The detection server 200, having received pose data and location data detects peripheral terminals 122, 124, and 126 existing within a predetermined radius from a reference location based on the pose data and the location data (S220). In this case, terminals 122, 124, 126, 132, 134, and 136 of FIG. 1 are terminals previously subscribed to a service according to the present exemplary embodiment and are terminals in which providing of pose data and location data and message reception is allowed by the user. The detection server 200 transmits a signal that requests pose data to the detected peripheral terminals 122, 124, and 126 (S225). The peripheral terminals 122, 124, and 126 each collect pose data according to a request (S230) and transmit the collected pose data to the detection server 200 (S235). The detection server compares the received pose data and detects the synchronized terminal 124 having a pose similar to that of the mobile terminal 110 among the peripheral terminals 122, 124, and 126. When the mobile terminal 110 receives a detection result of the synchronized terminal 124 from the detection server 200 (S245), the mobile terminal 110 may transmit a message to the synchronized terminal 124 (S250, S255). The message may be, for example, a text message that expresses a user mind and a profile information message of a user. The user profile may include general information of the user, such as a picture, an age, or a job of the user, or information, in which a user of the synchronized terminal 124 can visually determine, such as presently wearing clothing and a hair style. The user profile may enable the user of the synchronized terminal 124 to determine who is the user of the mobile terminal 110. According to an exemplary embodiment, in order for the user of the synchronized terminal 124 to easily determine the user of the mobile terminal 110, having transmitted a message, the mobile terminal 110 may transmit additional information such as a location direction and distance thereof. For example, the user of the mobile terminal 110 may dispose the mobile terminal 110 toward the synchronized terminal 124 (S260) and may transmit direction information of the mobile terminal 110 to the synchronized terminal 124 (S265, S270). Further, the user of the mobile terminal 110 may input a distance between the mobile terminal 110 and the synchronized terminal 124 and transmit the distance to the synchronized terminal 124. The synchronized terminal 124 may determine a direction or a distance in which the mobile terminal 110 is located based on received information and notify the user of the synchronized terminal 124 of the direction or the distance (S280). FIG. 3 is a diagram illustrating a method in which a synchronized terminal notifies a location of a mobile terminal through a screen. For example, the synchronized terminal 124 may display a direction of the mobile terminal 110 on a screen based on a location direction of the synchronized terminal 124, as shown in FIG. 3A. For another example, while moving the synchronized terminal 124, when a direction of the synchronized terminal 124 corresponds with a direction of the mobile terminal 110, the synchronized terminal 124 may generate alarm (sound, vibration, and flicker). For another example, as shown in FIG. 3B, a camera mounted in the synchronized terminal may photograph an image, augment an object (e.g., a heart shape) representing a location of the mobile terminal 110 in the photographed image, and output the object on the screen. According to another exemplary embodiment, when the user of the synchronized terminal 124 selects a received message, the synchronized terminal 124 may send a signal to the corresponding mobile terminal 110 and enable the mobile terminal 110 to vibrate or enable an LED lamp or a screen of the mobile terminal 124 to flicker. The user of the synchronized terminal 124 may search for a terminal in which a vibration occurs or in which an LED lamp or a screen flickers at a periphery and determine the user of the mobile terminal 110. As in the foregoing exemplary embodiments, when the user of the mobile terminal 110, having transmitted a message is determined, the user of the synchronized terminal 124 may accept or reject a message according to a user of the determined mobile terminal 110.

Hereinafter, a process of detecting a synchronized terminal will be described in detail with reference to a flowchart of FIGS. 4 to 6.

Figure 4:
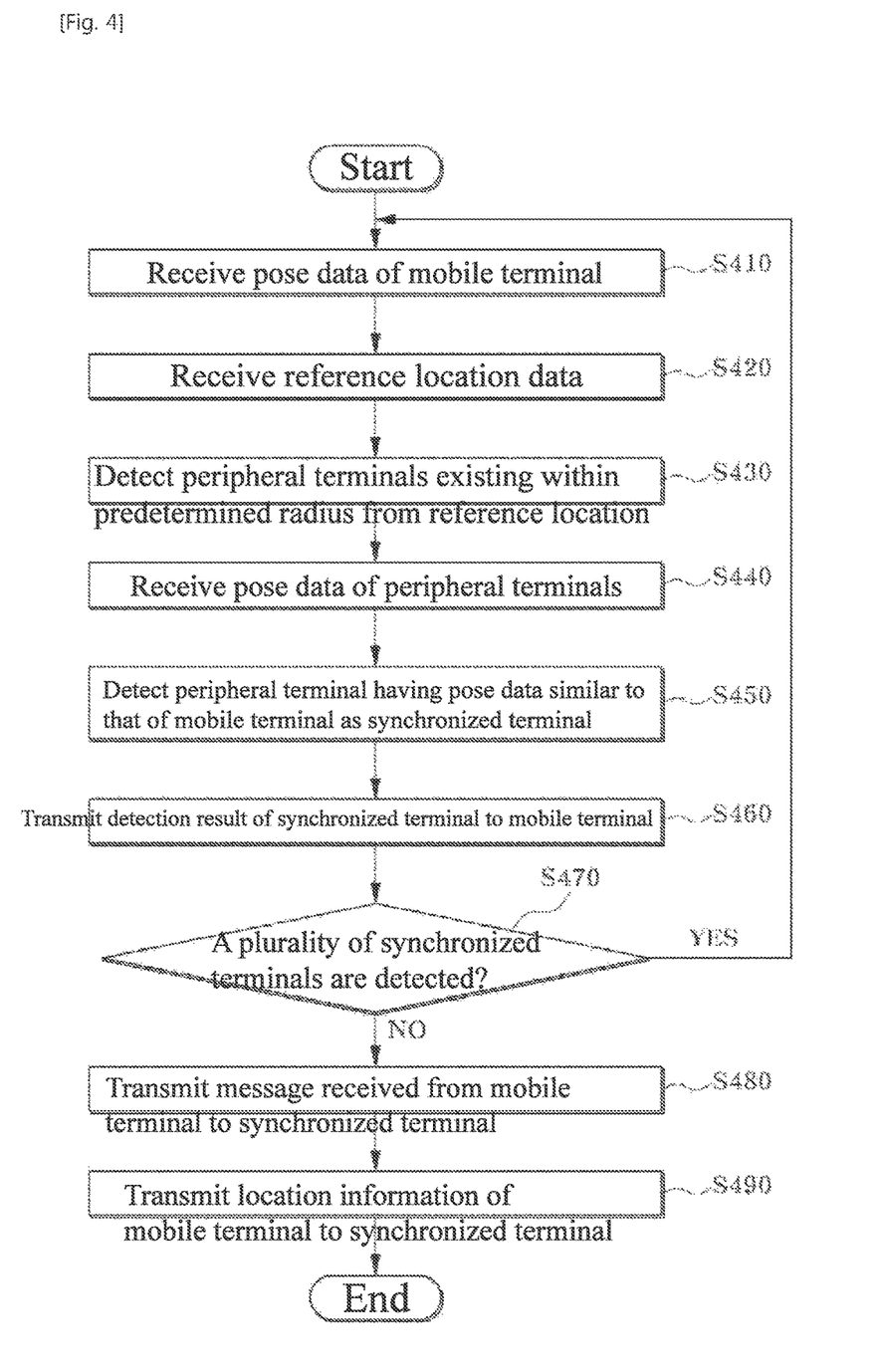
FIG. 4 is a flowchart illustrating a method in which a detection server detects a synchronized terminal having a pose similar to that of a mobile terminal according to an exemplary embodiment of disclosed technology.

FIG. 4 is a flowchart illustrating a method in which a detection server detects a synchronized terminal having a pose similar to that of a mobile terminal according to an exemplary embodiment of disclosed technology. The detection server 200 receives pose data from terminals previously subscribed to a service detects the peripheral terminal 124 having a pose similar to that of the mobile terminal 110 according to a request of the mobile terminal 110.

The detection server 200 receives pose data including at least one of a located direction and an inclined level of the mobile terminal 110 from the mobile terminal 110 (S410). The detection server 200 receives location data to be a reference to detect the synchronized terminal 124 (S420). For example, when a location to be a reference is a location of the mobile terminal 110, the detection server 200 may receive location data of the mobile terminal 110 from the mobile terminal 110 or a base station of a wireless network to which the mobile terminal 110 belongs. For another example, the mobile terminal 110 may designate a predetermined location to a reference location and transmit location data to a detection server. The predetermined location may be, for example, a location at which a specific actor is located in a program presently broadcasting with a television. The detection server 200 detects peripheral terminals 122, 124, and 126 existing within a predetermined radius from a reference location determined based on the received location data (S430). For example, a predetermined radius may be set to 3 meters, 5 meters, or 10 meters and be determined with a distance input by a user, and a predetermined radius be adjusted according to a detection result. Terminals 122, 124, 126, 132, 134, and 136 are terminals previously subscribed to a service in which the detection server 200 provides and periodically provide location data thereof to the detection server 200. The detection server 200 requests pose data to the detected peripheral terminals 122, 124, and 126, and the peripheral terminals 122, 124, and 126 each collect pose data thereof and transmit the pose data to the detection server 200 (S440).

The detection server 200 detects a terminal having pose data similar to that of the mobile terminal 110 among the peripheral terminals 122, 124, and 126 as a synchronized terminal (S450). According to an exemplary embodiment, the detection server 200 compares a pose data value of the mobile terminal 110 or a symmetry value of pose data with a pose data value of the peripheral terminals 122, 124, and 126, and if a difference thereof is smaller than a threshold value, the detection server 200 may detect the peripheral terminal as the synchronized terminal 124. That is, the detection server 200 may detect a terminal having pose data that belongs within a threshold range from a pose data value of the mobile terminal 110 or a symmetry value of pose data as a synchronized terminal. In this case, by comparing also with a symmetry value of pose data, the detection server 200 determines whether a pose of the mobile terminal 110 and the synchronized terminal 124 is similar to a pose including a case in which the right side, the left side, the upper side, the lower side, the front, and the rear of the mobile terminal 110 and the synchronized terminal 124 are inverted (when seen from the front, when it is difficult to divide the upper side, the lower side, the front, and the rear) as well as a case in which the right side, the left side, the upper side, the lower side, the front, and the rear of the mobile terminal 110 and the synchronized terminal 124 are the same. According to another exemplary embodiment, the detection server 200 may compare a pose data value of the mobile terminal 110 or a symmetry value of pose data with a pose data value of the peripheral terminals 122, 124, and 126, and detect a terminal in which a difference thereof is smallest as the synchronized terminal 124. The detection server 200 transmits a detection result of the synchronized terminal 124 to the mobile terminal 110 (S460). According to an exemplary embodiment, when a plurality of synchronized terminals may be detected, the detection server 200 may determine whether a plurality of synchronized terminals are detected (S470). For example, if a plurality of synchronized terminals are detected, the detection server 200 may repeat step S410 of receiving pose data of the mobile terminal 110, step S440 of receiving pose data of a peripheral terminal, and step S450 of detecting as a synchronized terminal until the detection server 200 detects any one synchronized terminal of a plurality of synchronized terminals. The detection server 200 may repeat steps S410, S440, and S450 and may exclude a peripheral terminal having pose data deviating from a threshold range from a synchronized terminal or may determine a terminal having pose data most similar to that of the mobile terminal 110 as a final synchronized terminal. If one synchronized terminal is detected, the detection server 200 transmits a message received from the mobile terminal 110 to the detected synchronized terminal (S480). For example, the mobile terminal 110 may transmit a text message, a discount coupon or a free coupon of food or beverage, or a product coupon expressing a user mind to a synchronized terminal. Further, for another example, by transmitting a user profile thereof to the synchronized terminal 124, the mobile terminal 110 may enable a user of the synchronized terminal 124 to determine who is a user of the mobile terminal 110.

In the foregoing exemplary embodiment, a case of sending a message to the favorite opposite sex is illustrated, but disclosed technology may be applied to a sales promotion event of a company, a department store, and a mart. For example, when the user disposes a mobile terminal with the same pose as that of a sales promotion terminal (including a terminal having no mobile communication function) at a front gate of a department store, the department store side may provide a department store discount coupon to the user terminal. Further, for another example, disclosed technology may be applied to a program public relation service of a broadcasting company. For example, while the user views a television program, when disposing a mobile terminal of the user with the same pose as that of a terminal of an entertainer in which the user prefers and inputting program information or a reference location, the detection server may specify the entertainer. The user may transmit a message or a product coupon to an entertainer specified by the user among persons appeared in a program through a service of a broadcasting company.

Further, according to an exemplary embodiment, in order for the user of the synchronized terminal 124, having received the message to determine the user of the mobile terminal 120, the detection server 200 may transmit location direction or distance information of the mobile terminal 110 to the synchronized terminal 124 (S490).

Figure 5:
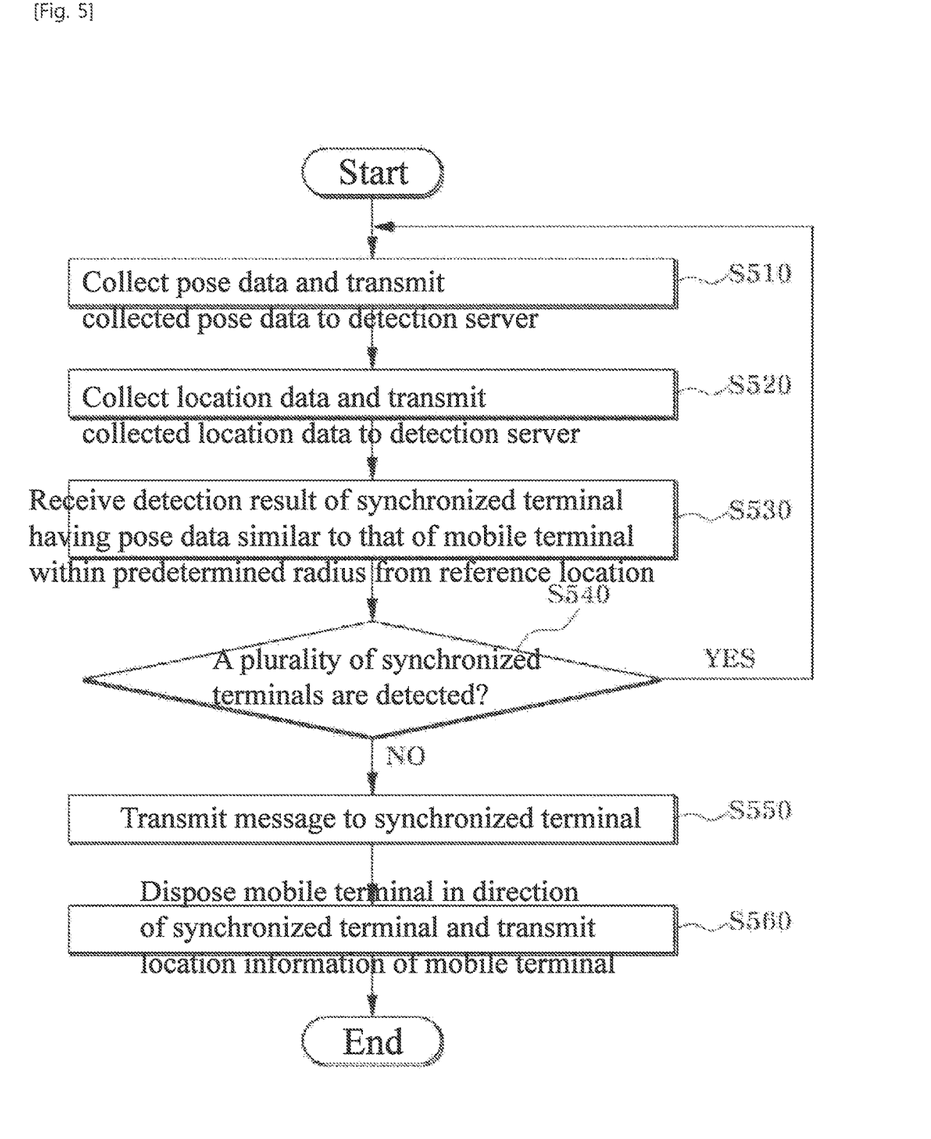
FIG. 5 is a flowchart illustrating a method in which a mobile terminal detects a synchronized terminal having a pose similar to that of the mobile terminal according to an exemplary embodiment of disclosed technology.

FIG. 5 is a flowchart illustrating a method in which a mobile terminal detects a synchronized terminal having a pose similar to that of the mobile terminal according to an exemplary embodiment of disclosed technology. First, the user of the mobile terminal 110 disposes the mobile terminal 110 with a pose similar to that of a terminal to detect, i.e., the synchronized terminal 124. Thereafter, the mobile terminal 110 collects pose data including at least one of a location direction and an inclined level thereof and transmits the collected pose data to the detection server 200 (S510). According to an exemplary embodiment, the mobile terminal 110 may collect location data thereof together with pose data and transmit the collected location data to the detection server (S520). In this case, location data may be generated based on GPS receiving information or location information received from a base station. The detection server 200, having received pose data from the mobile terminal 110 detects the synchronized terminal 124 having pose data similar to that of the mobile terminal 110 within a predetermined radius from a reference location based on the pose data. Thereafter, the mobile terminal 110 receives a detection result of the synchronized terminal 124 from the detection server 200 (S530). For example, the synchronized terminal 124 is a terminal to which a pose data value belongs within a threshold range of a pose data value of the mobile terminal 110 or a symmetry value of pose data. The mobile terminal 110 determines whether a plurality of synchronized terminals are detected based on a synchronized terminal detection result received from the detection server 200 (S540). If a plurality of synchronized terminals are detected, the mobile terminal 110 repeatedly performs step S510 of collecting, step S520 of transmitting, and step S530 of receiving until one synchronized terminal is detected. The mobile terminal may repeat steps S510 to S530 and may exclude a terminal having pose data deviating from a threshold range from a synchronized terminal or may determine a terminal having pose data most similar to that of the mobile terminal as a final synchronized terminal. If one synchronized terminal 124 is detected, the mobile terminal may transmit a message to the detected synchronized terminal 124 (S550). For example, the mobile terminal 110 may transmit a text message, a discount coupon or a free coupon of food or beverage, or a product coupon to the synchronized terminal 124. Further, for another example, by transmitting a user profile thereof to the synchronized terminal 124, the mobile terminal 110 may enable the user of the synchronized terminal 124 to determine who is a user of the mobile terminal 110. Further, according to an exemplary embodiment, in order for the synchronized terminal 124 to recognize a location of the mobile terminal 110, the user may dispose the mobile terminal 110 in a direction of the synchronized terminal 124 and transmit location direction information of the mobile terminal 110 to the detection server 200 or the synchronized terminal 124 (S560). In order to enhance accuracy, the user may provide distance information between the mobile terminal 110 and the synchronized terminal 124 as well as direction information to the detection server 200 or the synchronized terminal 124. The distance information may be estimated through, for example, a direct input from the user, an image processing, or a wireless signal processing.

Figure 6:
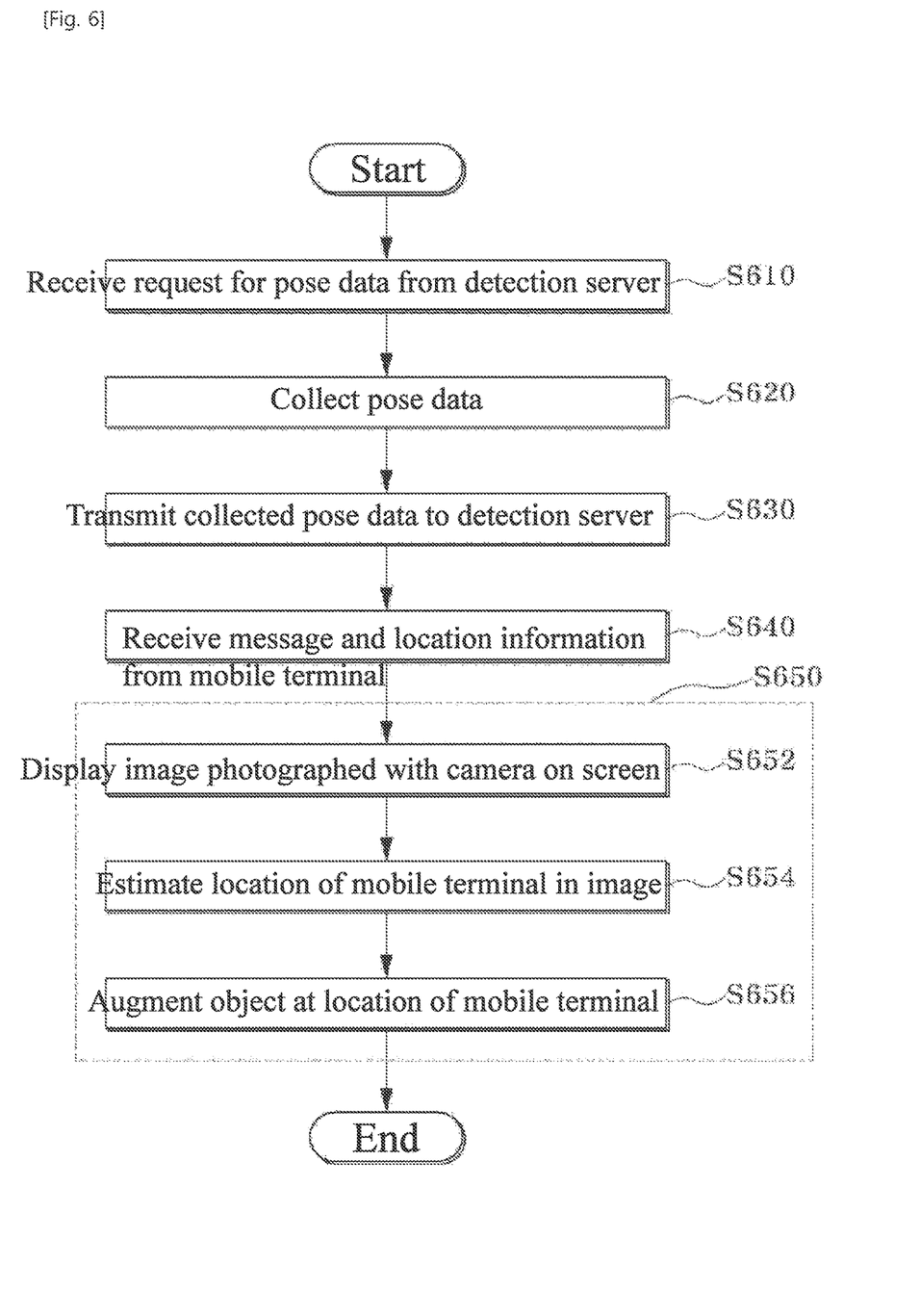
FIG. 6 is a flowchart illustrating a method of detecting a synchronized terminal having a pose similar to that of a mobile terminal in an aspect of the synchronized terminal according to an exemplary embodiment of disclosed technology.

FIG. 6 is a flowchart illustrating a method of detecting a synchronized terminal having a pose similar to that of a mobile terminal in an aspect of the synchronized terminal according to an exemplary embodiment of disclosed technology. The peripheral terminals 122, 124, and 126 including the synchronized terminal 124 receive a request for pose data from the detection server 200 according to a detection request of the mobile terminal 110 (S610). The synchronized terminal 124, having received a request for pose data collects pose data including at least one of a location direction and an inclined level thereof (S620) and transmits the collected pose data to the detection server 200 (S630). Thereafter, when the detection server 200 detects the synchronized terminal 124 and provides detection information to the mobile terminal 110, the synchronized terminal 124 may receive a message from the mobile terminal 110 (S640).

Further, according to an exemplary embodiment, in order to enable the synchronized terminal 124 to determine the user of the mobile terminal 110, the mobile terminal 110 may provide direction information of the mobile terminal 110 (S640). In this case, direction information may be direction information of the mobile terminal 110 when the mobile terminal 110 is located toward the synchronized terminal 124. In order to enhance accuracy, the mobile terminal 110 may provide together distance information between the mobile terminal 110 and the synchronized terminal 1240. The synchronized terminal 110 may notify the user of a location of the mobile terminal 110 through a user interface based on the received direction and distance information (S650). For example, as shown in FIG. 3A, the synchronized terminal 110 may display a direction of the mobile terminal 110 on a screen. For another example, when the synchronized terminal 110 is disposed toward the mobile terminal 110, the synchronized terminal 110 may generate alarm such as sound, vibration, and flicker. According to an exemplary embodiment, a method in which the synchronized terminal 124 notifies a location (at least one information of a direction and a distance) of the mobile terminal 124 through a user interface is the same as a method of steps S652 to S656. First, the synchronized terminal 124 displays an image photographed with a mounted camera on a screen thereof (S652). The synchronized terminal 124 estimates a location of the mobile terminal 110 in an image based on direction information received from the mobile terminal 110 (S654). For example, the synchronized terminal 124 may compare a location direction thereof and a direction of the mobile terminal 110 and estimate a location of the mobile terminal 110 based on a compared difference. The synchronized terminal 124 augments an object representing the mobile terminal 110 at an estimated location of the mobile terminal 124 in an image displayed on a screen (S656). The user of the synchronized terminal 124, having determined the user of the mobile terminal 110, having transmitted a message to the synchronized terminal 124 may perform correspondence such as acceptance or rejection of a message.

According to another exemplary embodiment, when the user of the synchronized terminal 124 selects a received message, by sending a signal to the corresponding mobile terminal 110, the synchronized terminal 124 may enable the mobile terminal 110 to vibrate or enable an LED lamp or a screen of the mobile terminal 124 to flicker. The user of the synchronized terminal 124 may search for a terminal in which a vibration occurs or in which an LED lamp or a screen flickers at a periphery and determine the user of the mobile terminal 110.

Figure 7:
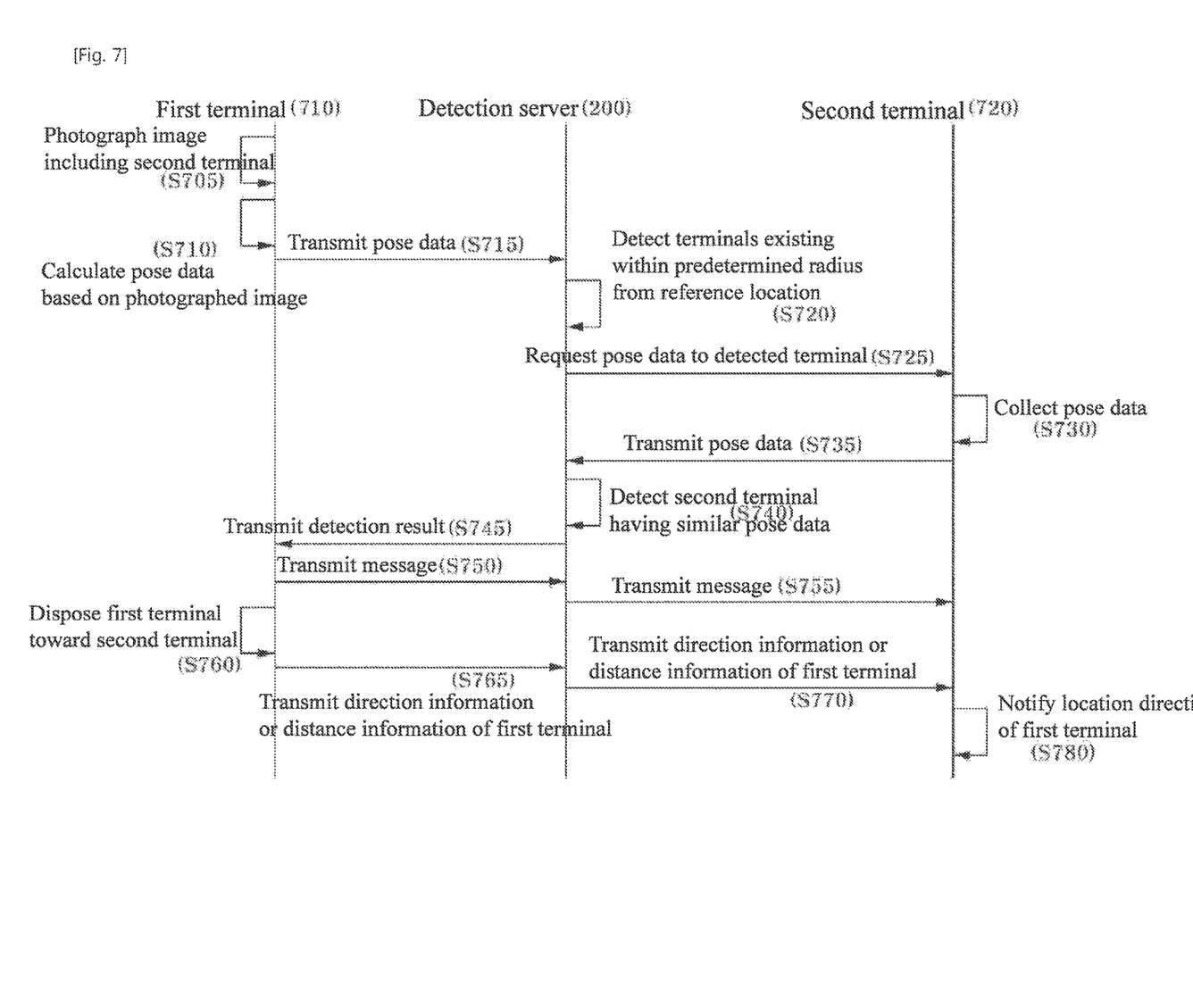
FIG. 7 is a flowchart illustrating a method in which a first terminal transmits a message to a second terminal located at a periphery according to another exemplary embodiment of disclosed technology.

FIG. 7 is a flowchart illustrating a method in which a mobile terminal transmits a message to a synchronized terminal located at a periphery according to another exemplary embodiment of disclosed technology. In a method of describing with reference to FIG. 2 and FIGS. 4 to 6, in order for a detection server 200 to acquire pose data to be a reference for detecting the synchronized terminal 124, the detection server 200 disposes the mobile terminal 110 with a pose similar to that of the synchronized terminal 124 and transmits pose data of the mobile terminal 110 to the detection server 200, but in an exemplary embodiment described with reference to FIG. 7, the mobile terminal photographs an image including the synchronized terminal and analyzes an image, thereby acquiring pose data to be a reference to detect the synchronized terminal. That is, in an exemplary embodiment described with reference to FIGS. 2 and 4 to 6, pose data of the mobile terminal is used as reference pose data for detecting the synchronized terminal, but in an exemplary embodiment described with reference to FIG. 7, reference pose data is calculated and used from a photographed image of the synchronized terminal. Hereinafter, a method of detecting a second terminal (corresponding to a synchronized terminal) and in which a first terminal (corresponding to a mobile terminal) transmits a message to a detected second terminal will be described with reference to FIG. 7.

A first terminal 710 photographs an image including a second terminal 720 (S705). In this case, the first terminal 710 may be a mobile phone, a smart phone, a Personal Digital Assistant (PDA), or a tablet terminal that houses a camera for photographing a still picture or a moving picture. The first terminal 710 calculates pose data including at least one of a location direction and an inclined level of the second terminal 720 based on a photographed image (S710). According to an exemplary embodiment, the first terminal 710 may extract the second terminal 720 from a photographed image and perform an image processing process that calculates a location direction or an inclined angle of the second terminal 720. A location direction of the second terminal 720 may be more accurately calculated using direction information of the first terminal 710. For example, the first terminal 710 may collect direction information of the first terminal 710 using a terrestrial magnetic sensor included in the first terminal 710 and adds a direction of the second terminal 720 within an image to a direction of the first terminal 710 and thus calculate an actual direction of the second terminal 720. When pose data of the second terminal 720 located within a photographed image is calculated, the first terminal 710 transmits the calculated pose data to the detection server 200 (S715). According to an exemplary embodiment, unlike steps S710 to S715 of FIG. 7, when a terrestrial magnetic sensor value and an image photographed by the first terminal 710 are transmitted to the detection server 200, the detection server 200 may calculate pose data including at least one of a location direction and an inclined level of the second terminal 720 from the image.

When the detection server 200 acquires pose data to be a reference for detecting the second terminal 720 through steps S705 to S715, the first terminal 710 may regard a terminal having pose data similar to the acquired pose data as the second terminal 720 and transmit a message. That is, the detection server 200 receive respective pose data from terminals existing within a predetermined radius from a reference location (e.g., a location of a first terminal) and determine a terminal having pose data similar to that acquired through steps S705 to S715 among the terminals as the second terminal 720 (S720 to S740), and enables the first terminal 710 to transmit a message to the second terminal 720 (S745 to S755). Thereafter, in order for a user of the second terminal 720 to identify the first terminal 710, the first terminal 710 may transmit at least one of direction information when the first terminal 710 is located toward the second terminal 720 and distance information between the first terminal 710 and the second terminal 720 to the second terminal 720 (S760 to S770). Steps S220 to S280 of FIG. 2 and portions described to correspond thereto in FIGS. 4 to 6 may be similarly applied to steps S720 to S780 and thus a detailed description thereof will be omitted.

Disclosed technology may be implemented with a computer readable code in a recording medium that may be read by a computer. A computer readable recording medium includes an entire kind of record device that stores data that may be read by a computer system. A computer readable recording medium includes, for example, a Read Only Memory (ROM), a Random Access Memory (RAM), a Compact Disc-Read Only Memory (CD-ROM), a magnetic tape, a floppy disk, an optical data storage device, and a medium implemented in a form of carrier wave (e.g., transmission through Internet). Further, in the computer readable recording medium, codes distributed in a computer system connected to a network and in which a computer may read with a distributed method may be stored and executed. A functional program, a code, and a code segment for implementing the present invention may be easily deduced by programmers of a technical field to which the present invention belongs.

In a description described with reference to FIGS. 2 to 7, a case of transmitting a message to the favorite opposite sex is described, but disclosed technology may be applied to various services such as a sales promotion service and a public relation service. That is, a system and apparatus, which are disclosed technology are described with reference to an exemplary embodiment shown in the drawings for better understanding, but this is an illustration and those skilled in the art will recognize that a number of changes, modifications, or alterations to disclosed technology as described herein may be made, none of which depart from the spirit of disclosed technology. Therefore, the scope of disclosed technology should be determined by the appended claims.

The invention claimed is:

1. A method of detecting a synchronized terminal, the method comprising:
   identifying, by a detection server, a plurality of peripheral terminals located near a reference location;
   receiving, by the detection server, pose data of the plurality of peripheral terminals;
   detecting, by the detection server, a peripheral terminal having pose data identical to a reference pose data or pose data similar to a reference pose data within a certain range, from among the plurality of peripheral terminals; and
   determining, by the detection server, the peripheral terminal having pose data identical to the reference pose data or pose data similar to the reference pose data within a certain range as the synchronized terminal,
   wherein the pose data is an inclined angle of the peripheral terminal, a rotation angle of the peripheral terminal, or sequence information on angle changes of the peripheral terminal.

2. The method of claim 1, wherein the reference pose data is related to a mobile terminal.

3. The method of claim 1, further comprising transmitting, by the detection server, a message received from a mobile terminal to the synchronized terminal.

4. The method of claim 1, wherein the synchronized terminal generates an alarm.

5. A method in which a mobile terminal detects a synchronized terminal, the method comprising:
   collecting, by the mobile terminal, a reference pose data of the mobile terminal;
   transmitting, by the mobile terminal, the reference pose data to a detection server; and
   receiving, by the mobile terminal, a detection result of the synchronized terminal which is a peripheral terminal having pose data identical to the reference pose data of the mobile terminal or pose data similar to the reference pose data of the mobile terminal within a certain range among a plurality of peripheral terminals,
   wherein the pose data is an inclined angle of the peripheral terminal, a rotation angle of the peripheral terminal, or sequence information in which an angle of the peripheral terminal changes.

6. The method of claim 5, further comprising collecting, by the mobile terminal, location data thereof as a reference location and transmitting the location data to the detection server.

7. The method of claim 5, further comprising transmitting, by the mobile terminal, a message to the detected synchronized terminal.

8. The method of claim 5, further comprising repeatedly performing, by the mobile terminal, the collecting step, the transmit step, and the receiving step until detecting one synchronized terminal.

9. A method of receiving a message, the method comprising:
   identifying, by a terminal, a pose data of the terminal;
   transmitting, by the terminal, the pose data to a detection server;
   receiving, by the terminal, a message when the pose data of the terminal is identical to a reference pose data or when the pose data of the terminal is similar to the reference pose data within a certain range,
   wherein the pose data is an inclined angle of the terminal, a rotation angle of the terminal, or sequence information in which an angle of the terminal changes.

10. A non-transitory computer readable recording medium on which a program for executing the method of claim 1 is recorded.

* * * * *